United States Patent [19]

Flowers

[11] Patent Number: 4,777,726
[45] Date of Patent: Oct. 18, 1988

[54] GUIDE FOR PORTABLE CIRCULAR HAND HELD POWER SAWS

[76] Inventor: Randy Flowers, 2107 Sundew Cir., Anchorage, Ak. 99502

[21] Appl. No.: 55,617

[22] Filed: May 28, 1987

[51] Int. Cl.⁴ .................................................. B23D 47/02
[52] U.S. Cl. .............................................. 30/374; 83/487
[58] Field of Search .............................. 30/373-377; 83/745, 761, 374, 487

[56] References Cited

U.S. PATENT DOCUMENTS

| | | |
|---|---|---|
| 1,771,137 | 7/1930 | Neal . |
| 3,903,774 | 9/1975 | Stinson .............................. 83/487 X |
| 4,059,038 | 11/1977 | Rietema ................................ 83/745 |
| 4,335,512 | 6/1982 | Sheps et al. .......................... 30/376 |
| 4,453,312 | 6/1984 | Nishioka ............................... 30/372 |
| 4,522,098 | 6/1985 | Bliss ..................................... 83/745 |

FOREIGN PATENT DOCUMENTS 3237703  4/1984  Fed. Rep. of Germany ........ 30/374

Primary Examiner—Douglas D. Watts
Attorney, Agent, or Firm—Warren F. B. Lindsley

[57] ABSTRACT

A guide for use with a portable circular hand held power saw in making square cuts across a board or plank. A spring biased hinged flap slidably secured beneath the base plate of the saw bears against the edge of the plank throughout the course of the cut, maintaining the perpendicular orientation of the saw relative to the work piece.

4 Claims, 2 Drawing Sheets

GUIDE FOR PORTABLE CIRCULAR HAND HELD POWER SAWS

BACKGROUND OF THE INVENTION

Portable circular hand held power saws are widely used in the building industry, since they save time and money in labor costs. It is especially useful in connection with framing and other types of rough carpentry involving the cutting of large numbers of planks, posts and "2×4's" to length. Quite frequently, such construction members are measured, marked and cut in one swift stroke at the point of installation. No time is wasted in carrying the material to a stationary saw or in the slow and laborious process of cutting the material with a handsaw of the nonpowered variety.

While a high degree of precision in "rough carpentry" is not required, it is important in cross cutting to accurately cut the material to the right length, but also cut it perpendicular to the longitudinal axis of the material, i.e. squareness of the cut. The carpenter must, therefore, first measure for length. Then, using a square, he must mark the cutting line to be followed by the saw. Because the actual cutting operation is accomplished so quickly with the power handsaw, the measuring and marking operations tend to consume more time than the cutting operation itself.

Various devices and fixtures are described in the prior art for use in guiding or directing different types of saws, but none provide the degree of simplicity and convenience of the guide disclosed and claimed herein.

DESCRIPTION OF THE PRIOR ART

The following U.S. Patents disclose guides for aligning a saw with the material to be cut.

U.S. Pat. No. 1,771,137 discloses a device for use with a cross cut saw in the felling of a tree, with the device serving as a guide and rest for the saw. The device comprises a pointed bar adapted to be driven into the tree, a saw supporting plate swingingly mounted upon the bar with a roller and spring arrangement for controlling the free end of the saw on the side of the tree opposite the person wielding the saw.

U.S. Pat. No. 4,059,038 discloses a guide piece for a portable power saw. The user places the guide piece upon the material to be cut, and aligns a reference edge of the guide piece with a line on the work piece along which the material is to be cut. The guide piece guides the saw as the cut is being made to assure a straight cut along the desired path.

U.S. Pat. No. 4,335,512 discloses a device for facilitating repeated cuts with a portable hand held power saw. The device comprises a guide bar that is slidably attached to the saw and is adapted to be clamped to the work piece that is to be cut. The clamping mechanism incorporates means for adjusting the angle to be cut so that perpendicular and angular cuts may be made relative to the clamping edge.

U.S. Pat. 4,453,312 discloses a saw aligning device in the form of an attachment for a power handsaw. The attachment comprises an aligning plate that bears against the edge of the material to be cut and a shaft secured to the side of the saw housing. The shaft extends in the general direction of the cutting movement of the saw, and moves through a bore in a sleeve supported by the aligning plate so that the cut made by the saw is guided in a direction perpendicular to the edge against which the plate abuts.

U.S. Pat. No. 4,522,098 discloses a guide that is clamped on a door or similar object to guide a portable circular saw to insure an accurate cut. An elongated rib on the guide is aligned with and approximately spaced apart from the line of the cut that is to be made. The rib guides and stabilizes the saw as the cut is made.

SUMMARY OF THE INVENTION

In accordance with the invention claimed, an improved guide for a portable circular hand held power saw is provided, comprising a hinged flap used to align the saw blade of the saw perpendicular to the material to be cut.

It is, therefore, an object of the present invention to provide an improved guide for a portable circular hand held power saw.

Another object of this invention is to provide such a guide in a form that obviates the use of a square for marking the work piece prior to cutting, so that the only marking needed is that required to show the length dimension.

A further object of this invention is to provide such a guide in a form that requires no added steps such as adjusting or clamping of the guide to the work piece prior to a cutting operation.

A still further object of this invention is to provide such a guide in a form that significantly reduces the time required for the total marking and cutting operation.

A still further object of this invention is to provide such a guide in a form that automatically resets itself to the guide position when the cut is completed.

Yet another object of this invention is to provide such a guide in a simple and inexpensive form that does not significantly add to the total cost of the power handsaw.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which.

DESCRIPTION OF THE PREFERRED EMBODIMENT

Figure 1:
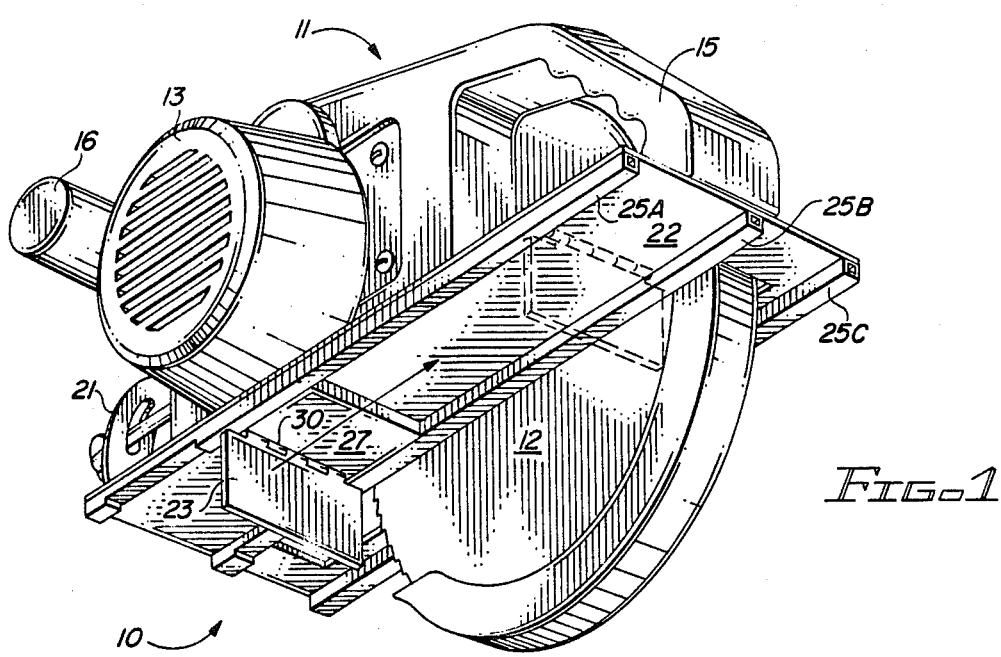
FIG. 1 is a perspective view showing the underside of a portable circular hand held power saw having attached thereto a saw guide embodying the invention.
Figure 2:
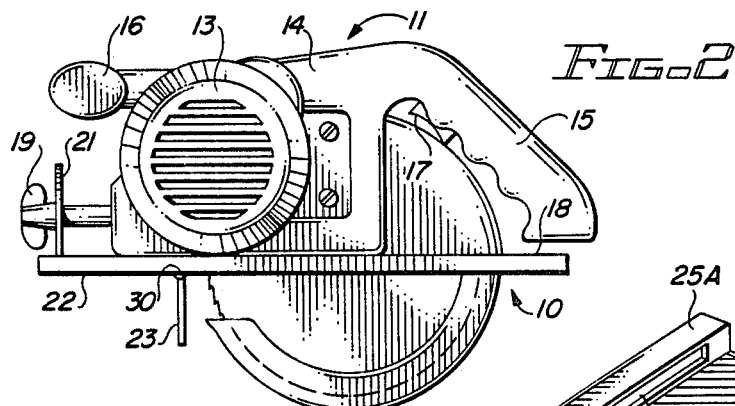
FIG. 2 is a side view of the power saw and guide shown in FIG. 1.

Referring more particularly to the drawings by characters of reference, FIGS. 1 and 2 disclose a saw guide 10 attached to a portable circular hand held power saw 11 and embodying the claimed invention.

The hand held power saw 11 employs a rotating circular blade 12 powered by an electric motor 13 enclosed in a metal or plastic housing 14 into which are molded two hand grips 15 and 16 and a power ON/OFF switch 17. Housing 14 is pivotally mounted upon a base plate 18, the pivotal mounting of which permits blade 12 to be tilted from its normally vertical position through an angle of forty-five degrees. The saw can be locked in the upright position, or at any angle between this position and its forty-five degree movement limit by means of a locking screw and wing nut 19 that operates within an arcuate slot of a forward support bracket 21 that extends upwardly from the forward end of base plate 18.

As shown most clearly in FIGS. 3-6, saw guide 10 comprises a metal or plastic plate 22 employing a flap 23 pivotally attached thereto.

Plate 22 is shown as rectangular in shape, having overall dimensions matching those of base plate 18 of saw 11, and defining a longitudinal opening or slot 24 formed therein near one edge thereof to provide clearance for blade 12. Three longitudinal runners 25A, 25B and 25C are attached thereto or formed integral therewith on the underside of plate 22 with runners 25A and 25C at each of its two outer edges and runner 25B positioned inboard of slot 24. Runners 25A-25C may be formed of plastic or sheet metal, formed into hollow channels with approximately square cross-sectional configurations. Both ends of the runners may be tapered so that they will slide easily over the work piece, and are capped or plugged to prevent sawdust from entering therein. When guide 10 is attached to saw 11, runners 25A-25C move over the work piece supporting the weight of the saw.

Flap 23 is slidably and pivotally mounted on the underside of plate 22, and spring biased for movements longitudinally of plate 22.

Flap 23 together with slide plate 27 form a known hinge configuration pivotally interconnected by a pin passing through intermeshed and aligned cylindrical openings formed by arcuate shaped flanges extending from the adjoining edges of the two hinged members. Slide plate 27 is positioned and slidably secured between runners 25A and 25B with its ends 28 penetrating longitudinal slots 29 formed in the juxtapositioned edges of runners 25A and 25B. The space between the runners provides a recessed cavity in which plate 27 and its hinged joint 30 is positioned. The pivotal axis or hinged joint 30 is perpendicular to the forward motion of blade 12 of saw 11.

Figure 3:
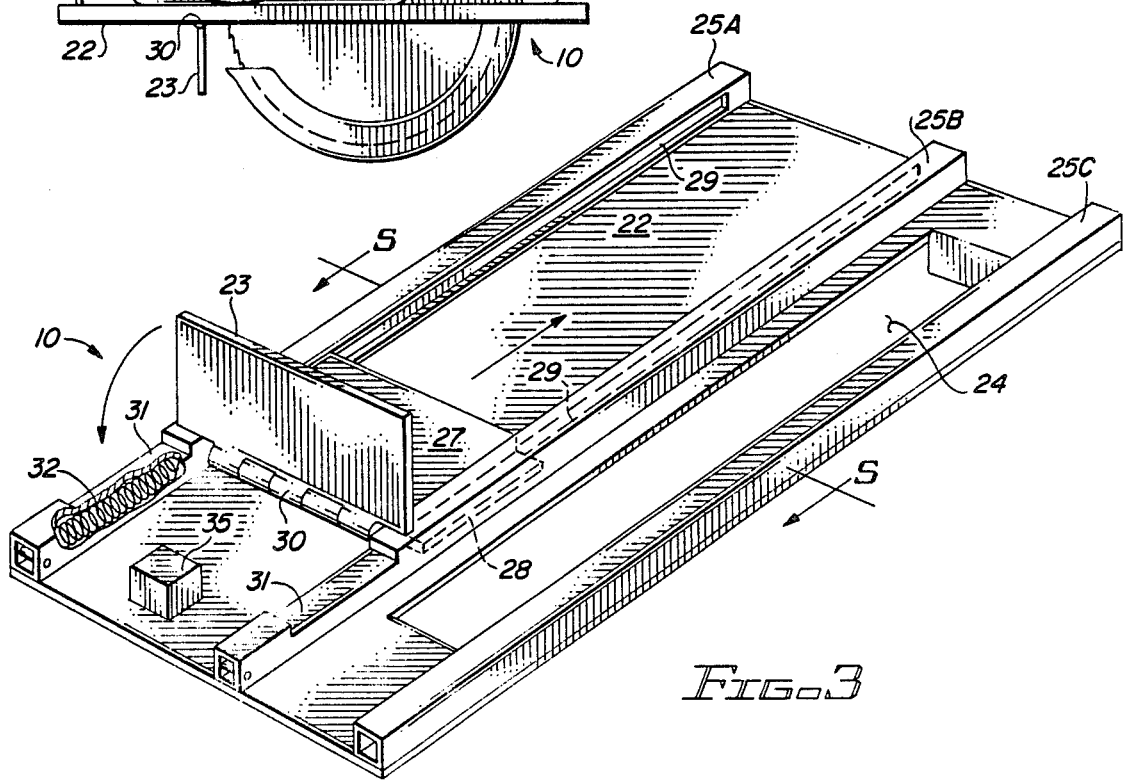
FIG. 3 is a perspective view showing the underside of the saw guide of FIGS. 1 and 2 with a portion partially cut away to reveal details of its interior structure.
Figure 5:
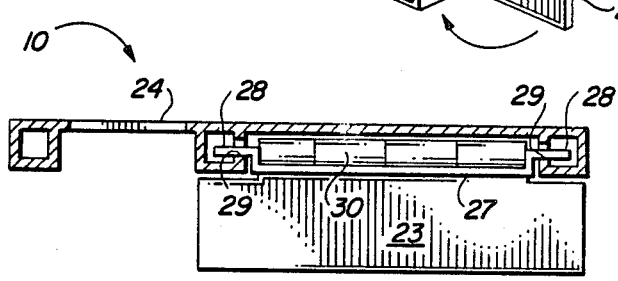
FIG. 5 is a cross-sectional view of FIG. 3 taken along the line 5—5.

As shown in FIGS. 3 and 5, hinge 30 and slide plate 27 is slidably secured to the underside of plate 22 between runners 25A and 25B at the side of plate 22 opposite slot 24. When guide 10 is mounted on saw 11, plate 27 is thus positioned directly under motor 13 with the exposed outer surface of plate 27 flush with the bearing surfaces of runners 25A and 25B between which it is mounted.

Figure 6:
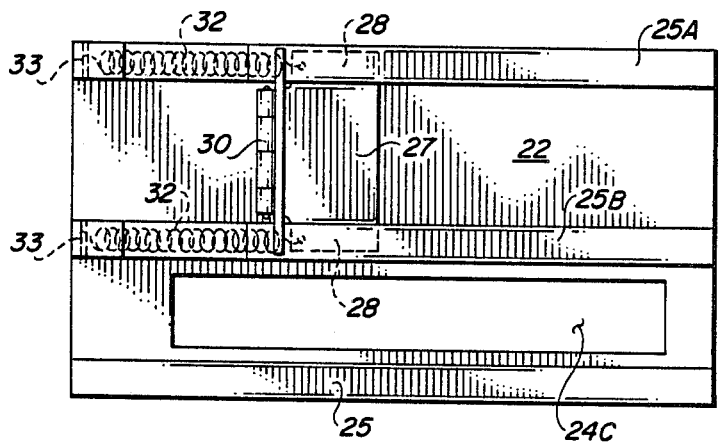
FIG. 6 is a top plan view of the saw guide with hidden portions of the mechanism shown in broken lines.

Plate 27 is rectangular in shape, with its two longer edges 23 oriented laterally relative to the cutting direction movement of saw 11 and perpendicularly to the longitudinal axis of runners 25A-25C. Its two shorter edges are provided with a flange extending outwardly thereof at a ninety degree angle to extend into slots 29 arranged in the juxtapositioned walls of runners 25A and 25B, as shown in FIGS. 3 and 6 of the drawings. As noted from the drawings, the narrow edge of plate 27 forms a guiding surface for plate 27 along the track means formed by the juxtapositioned surfaces of runners 25A and 25B.

In the preferred embodiment, slots 29 are located approximately midway between plate 22 on which it is mounted, and the bearing or sliding surface of the respective runner. The slots extend from the rearward ends of runners 25A and 25B to the forward most position of plate 27.

For smoother operation of slide plate 27 along slots 29, ends 28 of slide plate 27 may be fitted with neoprene or nylon covers that are molded to conform to the slotted openings and interiors of the associated runners 25A-25C.

Mounted inside the forward ends of each of the two hollow runners 25A and 25B between which plate 27 is positioned, are coil springs 32.

As shown in FIGS. 3 and 6, the forward ends of springs 32 are secured at the forward ends of the runners by means of lateral pins 33 or other suitable means. The rearward ends of the springs are secured to the forward edges of plate 27. Plate 27 is thus spring biased to a forward position by springs 32. An applied force in opposition to the spring force moves plate 27 rearwardly. Upon a subsequent relaxation of the applied force, the plate is returned to it forward position by the biasing action of the springs. The spring force at minimum displacement of plate 27 from its forward position should be significant relative to the force required to move the saw forward into the work piece, but not so great as to seriously increase the effort required to move the saw forward. The spring force will increase with the displacement of plate 27, but preferably at a relatively low rate of increase. A substantially constant spring force is ideally desired.

As shown most clearly in FIG. 3, the width of flap 23 is somewhat greater than the space between runners 25A and 25B. To accommodate the ends of flap 23 which extend past the widths of runners 25A and 25B between which plate 27 is mounted, depressions 31 are cut into the runners. When not in use, flap 23 is pivoted forward toward plate 22 so that its ends move into depressions 31 for storage. In this position, plate 23 is flush with the bearing surfaces of runners 25A-25C, and does not interfere with the movement of the runners over the surface of the work piece. A permanent magnet 35 attached to plate 22 holds flap 23 in its stored position.

Hinged joint 30 may be designed as a relatively stiff joint so that it retains its perpendicularly extended position until it is returned to its stored position. Alternatively, it may be spring biased to its extended position by means of a relatively weak spring incorporated in the hinge. Its pivotal rotation toward the fully extended position is limited at the perpendicular extension by the rotational limit of joint 30.

To use guide 10 with saw 11, it must be attached to base plate 18, as shown in FIGS. 1, 2, 7A and 7B.

Figure 4:
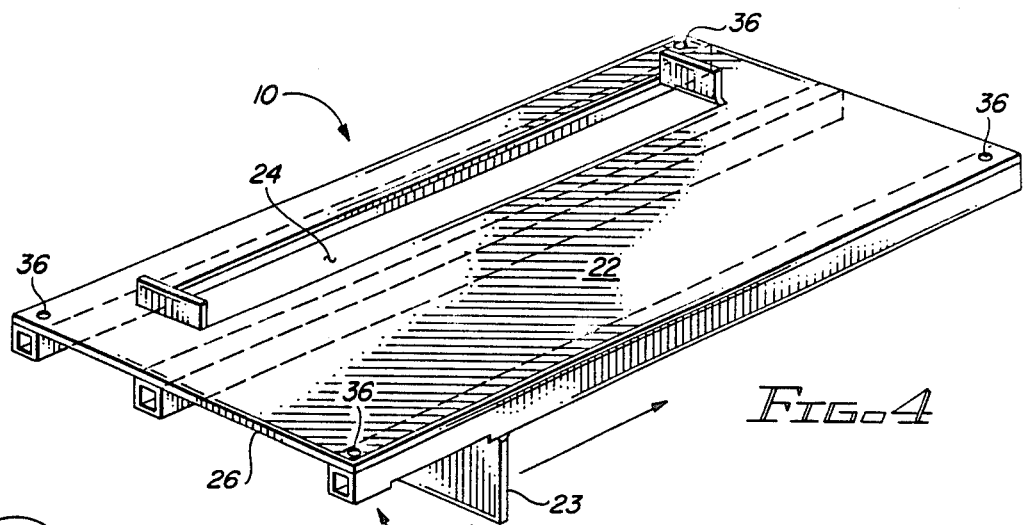
FIG. 4 is a perspective view showing the top side of the saw guide.

If saw 11 is an existing model, the design of which did not anticipate the use of guide 10, it may be necessary to drill mounting holes through base plate 18. Mating captured nuts or threaded holes 36 may be incorporated at the four outside corners of plate 22, as shown in FIG. 4. Screws passing through aligned holes in base plate 18 may then be threaded into holes 36 to secure guide 10 to saw 11.

Figure 7A:
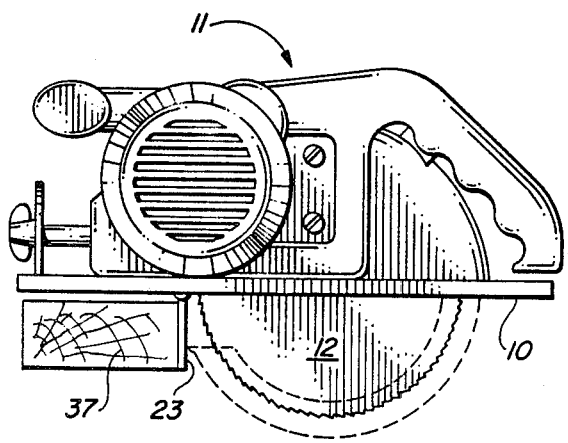
FIGS. 7A and 7B show the disclosed saw guide attached to a hand held circular power saw in two successive stages of use during a cutting operation.
Figure 7B:
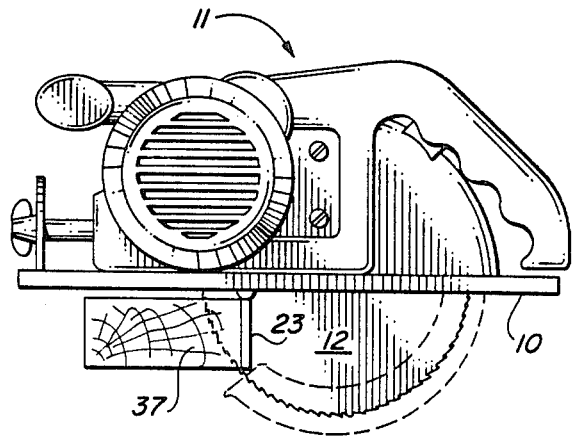

The use of guide 10 for making a square cut across a board or plank 37 is illustrated in FIGS. 7A and 7B. With the forward end of plate 22 resting on plank 37, saw 10 is moved forward until flap 23 bears against the edge of plank 37 as shown in FIG. 7A. With the saw in this position, the operator aligns the blade of the saw with the mark he has made at the edge of plank 37 to indicate the desired cut length of the plank. The operator then pivots the saw about its vertical axis until it is evident from the "feel" of the saw that flap 23 is flush over its entire surface with the edge of plank 37. The operator then proceeds to move the saw forward. The continuing pressure of flap 23 against the edge of plank 37 retains the perpendicular orientation of blade 12 relative to plank 37 as the cut proceeds. As the saw now moves forward and blade 12 cuts perpendicularly across plank 37, flap 23 and plate 27 are moved rearward toward the trailing edge of plate 22, as shown in FIG. 7B. When the cut is completed and the saw is lifted from the work piece, springs 32 return plate 27 and flap 23 to the forward position in readiness for the next cut.

It will be recognized that guide 10 may be incorporated into the basic original construction of saw 11 rather than being supplied as an attachment. In that case, the features of guide 10 would simply be incorporated in the structure of base plate 18.

A compact and inexpensive saw guide is thus provided, with full convenience of use in accordance with the stated objects of the invention, and although but a single embodiment of the invention has been illustrated and described, it will be apparent to those skilled in the art that various changes and modifications may be made therein without departing from the spirit of the invention, or from the scope of the appended claims.

What is claimed is:

1. A guide for attachment to a portable circular hand held power saw for aiding in cross cutting lumber comprising:
   plate means having one surface for attachment to a base plate of a portable circular hand held power saw, and another surface exposed for passing over the lumber to be cut,
   said plate means being provided with a slot extending therethrough for receiving a circular blade of the saw as the saw is moved across the lumber during a cutting operation.
   flap means pivotally mounted on said exposed surface of said mounting plate for extending laterally therefrom to a given position,
   track means for slidably guiding said flap means over said mounting plate,
   runners spacedly mounted on said exposed surface of said plate and extending substantially parallel with said track means, and
   spring means mounted between said mounting plate and said flap for biasing said flap means along said track means toward a starting position on said mounting plate for engagement with the edge of lumber to be cut and movable along said track means against the bias of said spring means during a lumber cutting operation,
   said spring means biasing said flap means back to said starting position upon completion of the cutting operation.

2. The guide set forth in claim 1 wherein:
   said flap means comprises a plate slidably attached to said track means for movement therealong.

3. The guide set forth in claim 2 wherein:
   said spring means comprises two coil springs, each mounted within a different one of said runners with each spring being secured at one end to said plate means and at their other ends to said plate.

4. The guide set forth in claim 2 in further combination with:
   hinge means for pivotally attaching said flap means to said plate for causing said flap means to pivot in only one direction from its given position.

* * * * *

UNITED STATES PATENT OFFICE
CERTIFICATE OF CORRECTION

Patent No. 4,777,726  Dated October 18, 1988

Inventor(s) Flowers

It is certified that error appears in the above-identified patent and that said Letters Patent are hereby corrected as shown below:

Claim 1, line 11, delete "." and substitute ---,---.

Claim 1, line 21, after "and said flap" insert ---means---.

Signed and Sealed this

Twenty-eighth Day of February, 1989

Attest:

DONALD J. QUIGG

Attesting Officer

Commissioner of Patents and Trademarks